United States Patent
Naffziger

(10) Patent No.: US 8,010,824 B2
(45) Date of Patent: Aug. 30, 2011

(54) SAMPLING CHIP ACTIVITY FOR REAL TIME POWER ESTIMATION

(75) Inventor: Samuel D. Naffziger, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 677 days.

(21) Appl. No.: 12/101,598

(22) Filed: Apr. 11, 2008

(65) Prior Publication Data
US 2009/0259869 A1 Oct. 15, 2009

(51) Int. Cl.
*G06F 1/32* (2006.01)
*G06F 11/30* (2006.01)

(52) U.S. Cl. ........ 713/340; 713/300; 713/320; 713/321; 375/224; 375/340

(58) Field of Classification Search .................. 713/300, 713/320, 321, 340; 375/224, 340
See application file for complete search history.

(56) References Cited

U.S. PATENT DOCUMENTS

| | | | |
|---|---|---|---|
| 5,712,826 A | 1/1998 | Wong et al. | |
| 5,764,089 A | 6/1998 | Partovi et al. | |
| 5,917,355 A | 6/1999 | Klass | |
| 6,278,308 B1 | 8/2001 | Partovi et al. | |
| 6,473,732 B1 * | 10/2002 | Chen | 704/205 |
| 6,597,620 B1 | 7/2003 | McMinn | |
| 6,611,435 B2 | 8/2003 | Kumar | |
| 7,301,373 B1 | 11/2007 | Bailey et al. | |
| 7,409,568 B2 | 8/2008 | Tam | |
| 7,420,378 B2 | 9/2008 | Audet | |
| 7,454,637 B2 | 11/2008 | Er | |
| 7,464,276 B2 * | 12/2008 | Rusu et al. | 713/300 |
| 7,498,694 B2 | 3/2009 | Luo | |
| 2008/0098242 A1 * | 4/2008 | Peterson | 713/320 |

OTHER PUBLICATIONS

Fischer, et al; "A 90nm Variable-Frequency Clock System for a Power-Managed Itanium®-Family Processor"; Solid-State Circuits Conference, 2005. Digest of Technical Papers. ISSCC. 2005 IEEE International, Publication Date: Oct. 2010 Feb. 2005, pp. 294-295 & 599. vol. 1, San Francisco, CA, ISSN: 0193-6530, ISBN: 0-7803-8904-2.

Karnik, et al "Scaling trends of Cosmic Rays induced Soft Errors in static latches beyond 0.18 pts" 2001 Symposium on VLSI Circuits of Technical Papers, pp. 61-62.

(Continued)

*Primary Examiner* — Thomas Lee
*Assistant Examiner* — Michael J Brown
(74) *Attorney, Agent, or Firm* — Rory D. Rankin; Meyertons, Hood, Kivlin, Kowert & Goetzel, P.C.

(57) ABSTRACT

A system and method for real-time power estimation. A core may be divided into units. Each unit is simulated to achieve a real power consumption characterization. The power consumption is sampled. Statistical analysis is performed that assumes the core has node capacitance switching behavior that is approximated by a stationary random process with a Poisson distribution. The statistical analysis determines the number of samples to take during a sample interval. The operational frequency, sample interval, and number of samples are used to determine the number of signals to sample. Signals are chosen that have a high correlation with the node capacitance switching behavior, such as clock enable signals on the last stage of a clock distribution system. Weights with tuned values are assigned to each sampled signal. Sampling occurs during every predetermined number of clock cycles. The weights of asserted sampled signals are summed in order to determine a repeatable power estimation value.

20 Claims, 6 Drawing Sheets

OTHER PUBLICATIONS

Goel, et al "Low-Overhead Design of Soft-Error-Tolerant Scan Flip-Flops with Enhanced-Scan Capability" 2006 Asia and South Pacific Conference on Design Automation, Jan. 24-27, 2006 pp. 665-670.

Krishnamohan, et al "A Highly-Efficient Techniques for Reducing Soft Errors in Static CMOS Circuits" pp. 126-131, 2004 IEEE International Conference on Computer Design (ICCD'04), 2004.

* cited by examiner

SAMPLING CHIP ACTIVITY FOR REAL TIME POWER ESTIMATION

BACKGROUND OF THE INVENTION

1. Field of the Invention

This invention relates to electronic circuits, and more particularly, to an efficient method of repeatable accurate real-time power estimation.

2. Description of the Relevant Art

The power consumption of modern integrated circuits (IC's) has become an increasing design issue with each generation of semiconductor chips. Increased IC power consumption directly affects the cost of building a system. As power consumption increases, more costly cooling systems such as larger fans and heat sinks must be utilized in order to remove excess heat and prevent IC failure. However, cooling systems increase the system cost. The IC power dissipation constraint is not only an issue for portable computers and mobile communication devices, but also for high-performance superscalar microprocessors, which may include multiple processor cores, or cores, and multiple pipelines within a core.

The power consumption of IC's, such as modern complementary metal oxide semiconductor (CMOS) chips, is proportional to the expression $\alpha f C V^2$. The symbol $\alpha$ is the switching factor, or the probability a node will charge up or discharge during a clock cycle. The symbol f is the operational frequency of the chip. The symbol C is the equivalent capacitance, or the switching capacitance, to be charged or discharged in a clock cycle. The symbol V is the operational voltage of the chip. In an attempt to reduce the power consumption of the chip, and to reduce the electrostatic fields within the transistors, the power supply voltage V may be decreased. There is a limit to the power supply voltage reduction, since this reduction decreases the amount of current that may flow through a transistor and, thus, increases the propagation delays through transistors. If the threshold voltages are reduced in order to turn-on the transistors at an earlier time and aid in maintaining performance, then transistor leakage current increases. An increase in transistor leakage current both increases power consumption and the potential for logic failure.

The geometric dimensions of devices and metal routes on each generation of cores are decreasing. Superscalar designs increase the density of integrated circuits on a die with multiple pipelines, larger caches, and more complex logic. Therefore, the number of nodes that may switch per clock cycle significantly increases. Operational frequencies have been increasing with each generation too. The switching factor, $\alpha$, may decrease for certain blocks or units in the chip by disabling the clock to these areas during periods of non-use. Therefore, although the operational voltage and switching factor may be decreasing with each generation of ICs, the other terms in the IC power consumption expression are increasing and cause an overall increase in power consumption. Some solutions to this power consumption increase include both microarchitectural and circuit-level techniques.

These design techniques are aided by efforts to estimate the power consumption in real-time. For example, while running an application or applications, if the real-time power consumption of a core is both known and conveyed to a power manager, then the power manager may alter the operational supply voltage, the operational frequency, or both in order to increase performance during low power consumption periods, or to decrease power consumption during high power consumption periods.

Real-time power estimation may be achieved by a monitor measuring the switching capacitance on a die during a particular clock cycle. A node capacitance, Cac, comprises both the switched, or ac, capacitance, and the effective capacitance resulting from crossover current. For a given part, leakage current is fixed when operation has reached the temperature limit. This leakage value can be accounted for by a fused-in power offset based on measurements at test time. Attempts to take advantage of temperature induced variations in leakage current is not encouraged due to repeatability reasons discussed below. Therefore, what is needed in order to obtain an accurate real-time estimation of the chip's power is the operational supply voltage, which is set digitally, the operational frequency, which is known, the fused-in leakage value found during testing, and a measurement of the number of nodes in the design switched in a particular clock cycle along with the node capacitance, Cac. The latter term, Cac, is not a straightforward value to measure on a semiconductor chip.

An on-chip monitor may attempt to measure the switching node capacitance, Cac. The monitor may measure the instruction issue rate within a core or within a processor with multiple cores. Accuracy increases if the behavior of major components such as the instruction issue queue, the reorder buffer, the physical register files, the execution units, and other, and their respective interactions are monitored. However, sampling the hundreds of signals to accomplish this task provides a huge overhead in additional metal routes, increased circuitry, and added power consumption.

Further, a monitor and subsequent response mechanism, such as a power manager, need to be deterministic. In other words, the monitor and mechanism need to provide the same results, or frequency changes, from part-to-part, system-to-system, and run-to-run. The reason for this requirement is Original Equipment Manufacturers (OEMs) using the processor in one of their systems need to provide performance guarantees to customers. Customers and OEMs need to replicate the benchmarks and performance measures at different times and in different locations. If this replication can not be done within a tight tolerance (i.e. +/−1.5%), then the monitor and response mechanism need to be turned off. Now the monitor and mechanism take up area on the die without performing useful work to improve performance and power savings.

Analog sensors, such as temperature sensors and/or an ammeter, are able to provide accurate power estimations, but all of them are environment dependent. Variations in fabrication processes, ambient temperature, power supplies, and the quality of the heat removal solution alter the measurements of analog sensors.

In view of the above, efficient methods and mechanisms for providing an accurate digital real-time power estimation of an IC are desired.

SUMMARY OF THE INVENTION

Systems and methods for accurate real-time power estimation are contemplated.

In one embodiment, a system is provided comprising a functional block, a power monitor, and a power manager. The power manager is configured to, in response to a power estimate number, convey operational voltage and frequency adjustments to the functional block in order to reverse power consumption behavior within the functional block. The functional block is configured to store a logic value for each of a predetermined number of sampled signals and convey the logic values to the power monitor. The power monitor is configured to store a weight value for each of the predetermined number of sampled signals, to sum the weight values of the only the sampled signals that have a stored logic value of a logic high value, and to convey the power estimate number to the power manager, wherein the power estimate number is translated from the sum of the weight values.

In another aspect of the invention, a method is provided to, in response to a power estimate number, convey operational voltage and frequency adjustments in order to reverse power consumption behavior. There is storage of a logic value for each of a predetermined number of sampled signals. There is also storage of a weight value for each of the predetermined number of sampled signals. An accumulation follows of the weight values of only the sampled signals that have a stored logic value of a logic high value. The power estimate number is translated from the sum of the weight values and is conveyed to a power manager.

In another aspect of the invention, a power monitor is provided comprising an interface configured to communicate with a functional block and a power manager. A weight table stores a weight value for each of the predetermined number of sampled signals. A weight accumulator sums the weight values of only the sampled signals that have a stored logic value of a logic high value. A chain control conveys a power estimate number to the power manager, wherein the power estimate number is translated from the sum of the weight values.

These and other embodiments will be appreciated upon reference to the following description and accompanying figures.

Figure 1:
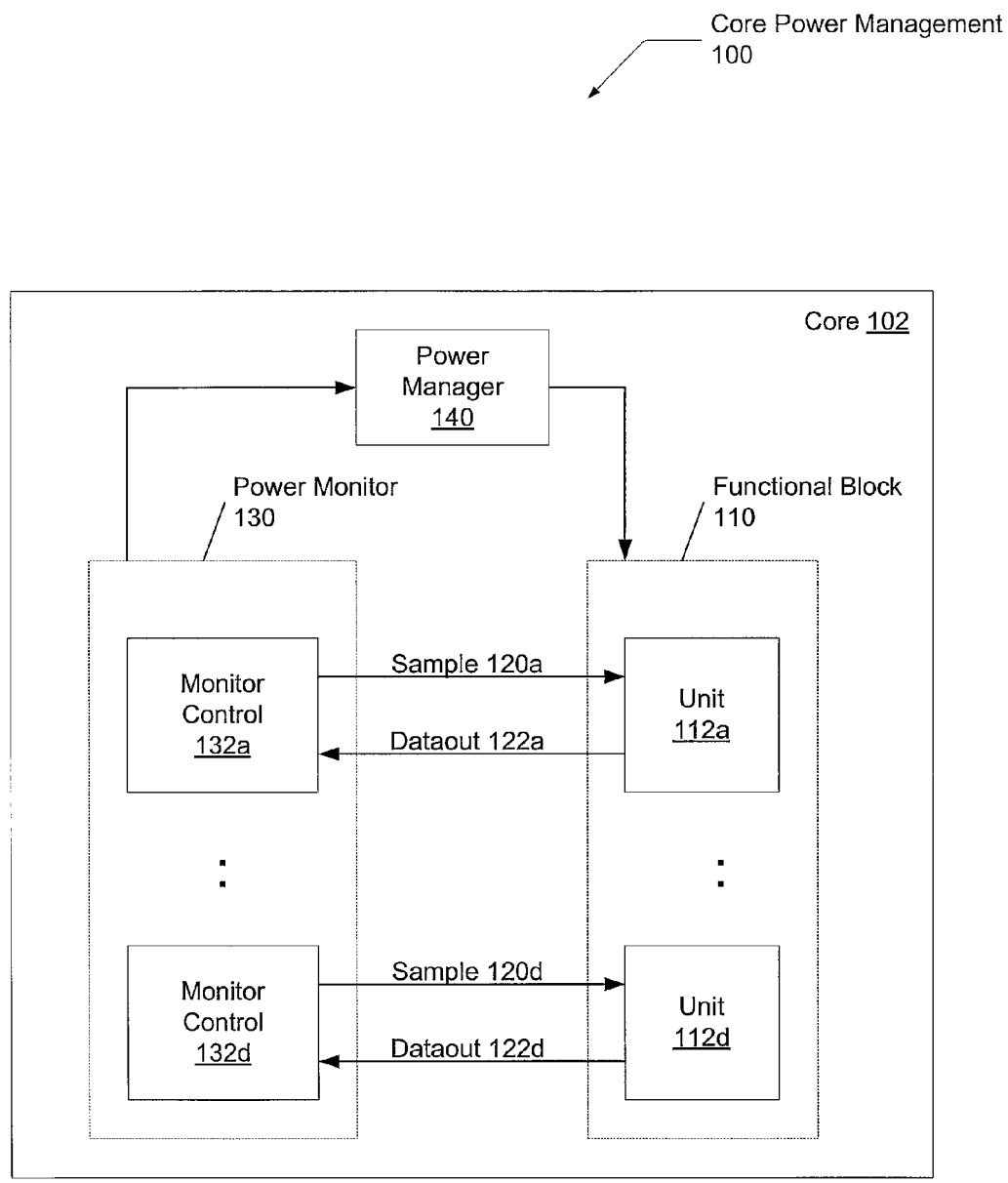
FIG. 1 is a general block diagram illustrating one embodiment of an IC, such as a core, with power management.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Referring to FIG. 1 one embodiment of a core power management 100 is shown. Here, core 102 may be any integrated circuit (IC). In one embodiment, core 102 may be a processor core. A processor core may have an on-die instruction and data cache. The processor core may be a superscalar processor with a single pipeline or multiple pipelines. In another embodiment, core 102 may be an application specific IC (ASIC). Any transistor family may be use to implement core 102. Examples include metal oxide semiconductor field effect transistors (MOSFETs) and bipolar junction transistors (BJTs).

A functional block 110 may include transistors configured to perform logic functions, data storage, or other. For power management purposes, functional block 110 may be divided into units 112a-112d. As used herein, elements referred to by the numeral followed by a letter may be collectively referred to by the numeral alone. For example, units 112a-112d may be collectively referred to as units 112. In one embodiment, units 112 may not correspond to functional components, such as a reorder buffer, a memory management unit, an execution unit, or other of a processor. Rather, units 112 may be selected based on the types of signals that need to be sampled for power management purposes. For example, clock enable signals routed to local clock distribution blocks may be the signals chosen to be sampled.

The selection of which signals to sample during a particular clock cycle may correspond to how well the selection correlates to the amount of switching node capacitance, Cac. A further description of the sample signal choice is provided later. The selected clock enable signals may overlap functional blocks in the floorplan. Therefore, the division separating, for example, unit 112a and 112b may not correspond to a division in the floorplan. Units 112 are units that consume power and this power is to be measured in real-time.

In one embodiment, Power Monitor 130 may be used to collect data from units 112, such as the logic values of all the predetermined sampled signals. After collecting the data, Power Monitor 130 may calculate a power consumption estimation. One Monitor Control 132 may correspond to each Unit 132. In alternative embodiments, a Monitor Control 132 may collect data for two or more Units 112 and calculate a total power estimation for those Units 112. In yet another embodiment, one Monitor Control 132 (i.e. Control 132a) may have a signal interface with one or more other Monitor Controls 132 (i.e. Controls 132b-132d) in order to collect data from the one or more Monitor Controls 132 (i.e. Controls 132b-132d). Then a power estimation for the one or more Monitor Controls 132 may be calculated.

Signals Sample 120 and Dataout 122 are control and data signals used for power management purposes. The interface signals between Power Monitor 110 and Functional Block 130 may comprise any necessary number of signals and communication protocols. In one embodiment, the control signal Sample 120 may be asserted for a single clock cycle only during a chosen repeating interval, such as every 100 clock cycles. In one embodiment, at a predetermined number of clock cycles after the control signal Sample 120 is asserted, the data signal Dataout 122 may begin providing a logic value for a different sampled signal each clock cycle. In other words, the data signal Dataout 122 may be used to scan out a chain of values comprising the logic values of the sampled signals at a particular cycle. Also, in other embodiments, there may not be a single pair of signals between each Monitor Control 132 and Unit 112 pair. In an alternative embodiment, additional signals may be included in order for a Monitor Control 132 to poll a Unit 112, for a Unit 112 to acknowledge to a Monitor Control 132 that it is ready to convey output data.

Once Power Monitor 130 calculates an accurate real-time power estimation from the data received from Functional Block 110, then Power Monitor 130 has determined the power profile of the currently running application(s). This determination is conveyed to Power Manager 140. Now the Power Manager 140 has an ability to decrease (or increase) power if the application is above (below) a threshold limit.

If a high power application or virus is executed on core 102, Power Manager 140 comprises circuitry configured to make adjustments to the operating voltage, the operational frequency, or both. For applications with an average power above a limit set for Cac, the operational frequency needs to be reduced. However, lower limits set for Cac allow the part to be binned at a higher frequency since it's guaranteed that no application will switch more than the Cac limit.

As mentioned before, one manner to estimate the core switching power is measuring the instruction issue rate. Unfortunately, for some embodiments of a core that may have many specialized operations, it is unlikely to have a few simple methods for estimating node capacitance, Cac, switching in a clock cycle due to data widths, performance enhancing circuitry, cache behavior uncertainties, one of many branch prediction methods, and so forth. In order to accurately estimate Cac from a few uncorrelated signals, those signals are not known until a decent power model is designed and a broad set of applications have run through it for signal power correlation checks. By that time it's too late to modify the design by trying to add the requisite signal sampling circuitry in the needed locations.

On the other hand, it is possible to sample a broad set of signals in the design that have a significant impact on power estimation. This approach may over-sample signals since many of the signals are likely correlated, and some signals may only have a small impact on power. However, if the design cost of somewhat over-sampling is small, such as with an efficient implementation, then an increase in the confidence of an accurate Cac monitor may increase significantly with this approach.

As mentioned before, sampling hundreds of signals in the design that have a non-trivial impact on Cac would be a significant design cost in terms of overhead in wires, circuitry, and even power consumption if the monitoring were done at full operational frequency. However, it is possible to take advantage of the fact that a Cac estimation that leads to a power estimation only needs to respond in thermal time frames, which is in the range of milliseconds. This time frame allows an estimation to use millions of cycles over which to determine an average Cac. In fact, if an estimation and subsequent response occurred too quickly, and responded to short term periods of high activity in an application, then the response may throttle the core. Then the performance may be reduced unnecessarily. An estimation needs to monitor the average power of the application over longer periods of time upon which the subsequent response and possible throttling is based. However, if the sample interval is extended to millions of cycles, the sigma, or standard deviation, of samples will increase significantly since the application has a decent probability of moving to a completely unrelated section of code. Based on power model data, a good correlation of activity for samples may be found in a certain range. For example, in one embodiment, a good correlation of activity for samples for a typical application may be in the 50K clock cycle domain where sigma is small.

If a few hundred known signals are chosen to be sampled upfront and the signal values are scanned out in a serial fashion, then a few hundred clock cycles are required to get a single sample of the activity related signals. Then from standard statistical analysis, a few samples are required of these few hundred signals before a confidence is reached (i.e. 99%) that the mean and sigma of the samples have a close correlation to the mean and sigma of the actual population of signals.

It is assumed that the switching behavior of the application can be approximated by a stationary random process with a Poisson distribution. Also, the central limit theorem tells us that a large population of data can be accurately approximated with a normal distribution. This statistical approach is similar to an approach used to produce opinion polls from a small sample of the population, statistical census numbers, etc. The characteristics of the broader population is reconstructed by taking a sufficient number of random samples. Two parameters that need to be determined are the number of necessary samples and which signals to sample.

For the number of necessary samples, in one embodiment, a spreadsheet may be generated using statistical analysis and measurements of both the real power consumption of an application and estimated power consumption from a sampling.

Figure 2A:
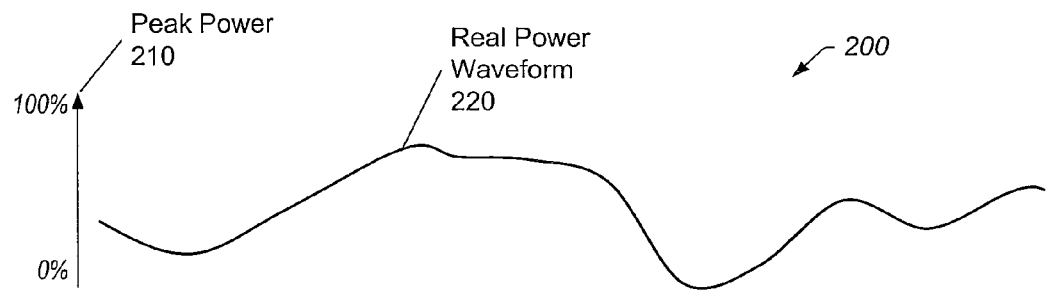
FIG. 2A is a generalized diagram illustrating one embodiment of a real power measurement of an application executed on a core during a sample interval.

FIG. 2A illustrates one embodiment of a real power measurement 200 of an application executed on a core during a sample interval. In an alternative embodiment, this power measurement may be performed on a subdivision of the core, such as a unit, a functional component, or other. In one embodiment, this measurement may be performed by a power model executed on a pre-silicon model of the core. Peak power 210 may be defined by functional failure of the core or by executing a high power virus on the core, such as Zuraski. The consumed power during the sample interval is shown by Real Power Waveform 220. In one embodiment, a sample interval may be in the range of tens of microseconds.

In modern processors, a thermal design power (TDP) may be set by a de-rated form of the high power virus Zuraski. This de-rated, or derived, TDP code and its corresponding power consumption is used to set the operational voltage and frequency of the core for binning purposes. During most of a modern processor's lifetime however, the applications that are executed, consume no more than 60% to 80% of this TDP value.

With an accurate real-time Cac estimation, and following power estimation, it is possible to exploit the 20% to 40% gap between an executed application and the TDP. This may be done by turning the gap into either a TDP reduction, wherein the new TDP is the application power, or a frequency increase, wherein the TDP is the same as before, but is consumed by typical applications. The TDP would not be consumed by a virus, since the virus would get throttled by a subsequent response by a power manager following the Cac estimation.

Figure 2B:
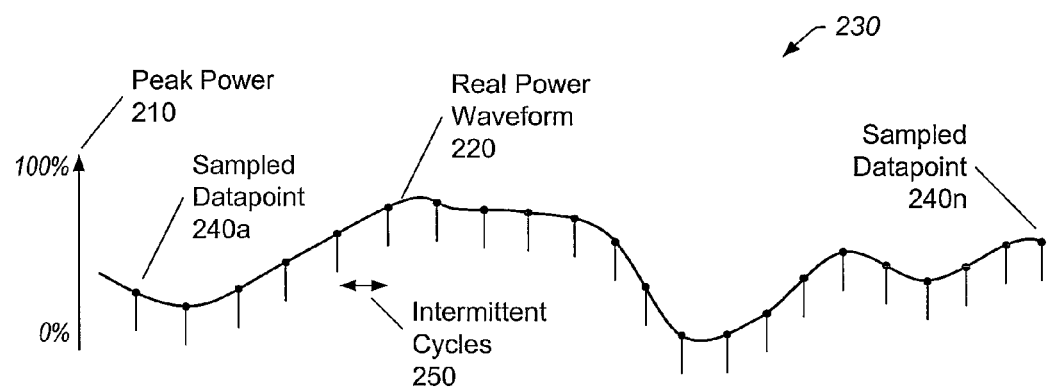
FIG. 2B is a generalized diagram illustrating one embodiment of a digital sampling of a real power measurement of an application executed on a core during a sample interval.

FIG. 2B illustrates one embodiment of a digital sampling 230 of a real power measurement of an application executed on a core during a sample interval. A Sampled Datapoint 240 is taken during each number of Intermittent Cycles 250. In the illustrated embodiment, a total of N samples are taken during the sample interval beginning with Sampled Datapoint 240$a$ and ending with Sampled Datapoint 240$n$. The determination of the number of intermittent cycles between sampling a power estimate value may depend on The determination of the values of the number of sampled datapoints, N, and the number of intermittent cycles depends on the desired accuracy and confidence.

As stated above, a spreadsheet, or look-up table, may be generated using both statistical analysis and measurements of both the real power consumption of an application and estimated power consumption from a sampling as shown in FIG. 2A-2B. Next a confidence and an error rate need to be chosen.

For example, in a first example, design goals may require a 95% confidence that the mean of a sample, such as one illustrated in FIG. 2B, over an entire core is within 12% of a sigma, or standard deviation, of the mean of the real application, such as one illustrated in FIG. 2A. The term 0.12*sigma is the error due to statistical sampling. Using the look-up table or spreadsheet, it may be determined that at least 500 samples, for example, are needed to achieve these design requirements. Recall that a Cac estimation that leads to a power estimation only needs to respond in thermal time frames, which is in the range of milliseconds. This time frame allows an estimation to use millions of cycles over which to determine an average Cac. A sample interval may be 25 μs. In one embodiment, the operational frequency may be 3 GHz. For this example, then the number of intermittent clock cycles between samples would be (3 GHz)*(25 μs)/500=150 clock cycles. In one embodiment, the values of the sampled signals may be scanned out in a serial manner. Therefore, 150 signals may be sampled in a single clock cycle and serially scanned out before the next sample is performed.

In this example, an absolute worst case estimation scenario may include a clipped normal distribution of +/−2 sigma, wherein one sigma is 25% of the range. Therefore, a worst case error is 0.12*0.25=3%. A more typical maximum sigma value is approximately 10%. With an error term of 12% sigma, it is possible to have a 95% confidence that the error due to statistical sampling is 0.12*0.1=1.2%.

In a second example, design goals may require a 99% confidence that the mean of a sample, such as one illustrated in FIG. 2B, over an entire core is within 10% of a sigma, or standard deviation, of the mean of the real application, such as one illustrated in FIG. 2A. The term 0.10*sigma is the error due to statistical sampling. Using the look-up table or spreadsheet, it may be determined that at least 650 samples are needed to achieve these design requirements. Further, in one embodiment, the core may be divided into 10 units, wherein each unit samples the same number of signals. The reason for this division is to increase accuracy as will be shown shortly. For each unit, only a 90% confidence is required. The sum of the confidences yields a 99% total confidence as $0.9^{1/10}$ is 0.9895. Using the look-up table or spreadsheet again, it may be determined for 650 samples and 90% confidence, the deviation from sigma is no longer 10%, but it is reduced to 6.5%. Although for an individual unit, the confidence level has decreased as its accuracy increased, the overall confidence level for the core remains unchanged at 99% and now its accuracy has improved from 10% to 6.5%.

If this second example has the same sample interval as above for the first example of 25 μs, and the operational frequency is the same at 3 GHz, then the number of intermittent clock cycles between samples would be (3 GHz)*(25 μs)/650=115 clock cycles. In one embodiment, as in the first example, the values of the sampled signals may be scanned out in a serial manner. Therefore, 150 signals may be sampled in a single clock cycle from each of the 10 units and serially scanned out before the next sample is performed.

Figure 3:
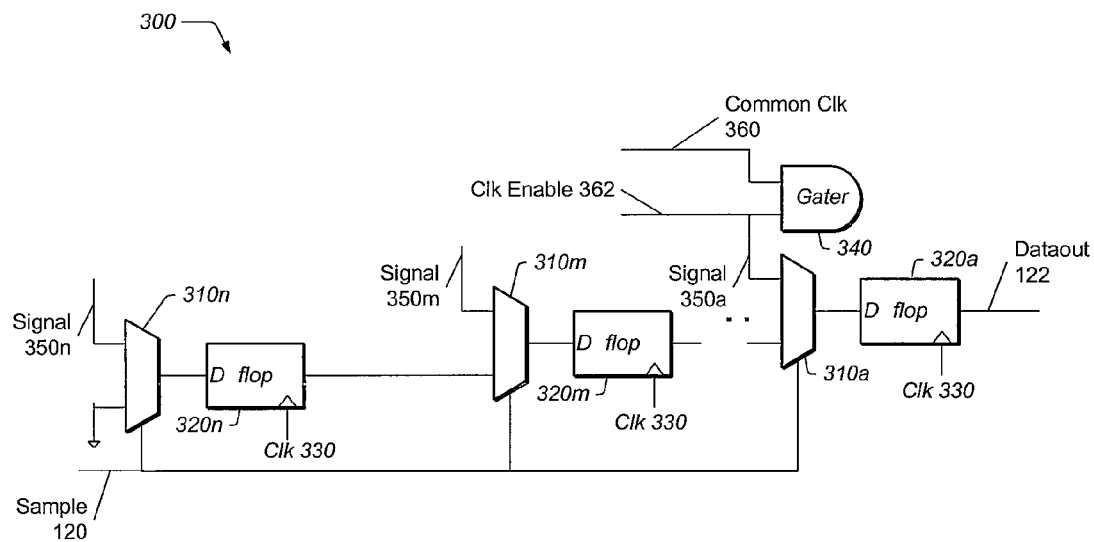
FIG. 3 is a generalized diagram illustrating one embodiment of circuitry for sampling signals and serially outputting the values of the sampled signals.

Referring to FIG. 3, one embodiment of circuitry 300 for sampling signals and serially outputting the values of the sampled signals is shown. In one embodiment, in order to capture the chosen signals to sample within a clock cycle, D flip-flop circuits 320 and multiplexers 310 may be placed as shown only for the signals to be sampled, which are represented by Signal 350. This added circuitry provides a low overhead for obtaining sampled data for accurate real-time Cac estimation. When the selection line, Sample 120, is asserted to a logic high value, Signal 350 is selected by the multiplexer 310 and stored by the D flip-flop 320.

The signal Sample 120 may be received from a control block such as Monitor Control 132 of FIG. 1. In one embodiment, the number of signals to sample in a unit on the core may be 100. In alternative embodiments, the number of signals to sample may be any number that provides an accurate power estimation for the particular core design. Sample 120 may be asserted for a clock cycle every 100 cycles, which allows the captured values of the sampled signals to be serially output between samples.

The clock signal Clk 330 that is routed to the D flip-flops 320 may be an ungated clock signal. When the signal Sample 120 is deasserted to a logic low value, the multiplexers 310 convey the output value of the previous D flip-flop 320. In this manner, the values during the sampled clock cycle of the 100 sampled signals, Signal 350, are output in a serial manner. Depending on the routing distance to the Monitor Control 132, inverter buffers may be placed following D flip-flop 320a.

In one embodiment, a signal chosen to be sampled may be the clock gater enable signals. A gater circuit may be the last stage of a clock distribution system that generates a clock signal. Typically, the gater circuits are in local blocks of a floorplan of a modern processor and local designers choose from a clock library a gater circuit to drive a certain clock load in the block.

The Gater Circuit 340 in FIG. 3 receives a Common Clock 360 from a previous stage in the clock distribution system and an enable signal, Clk Enable 362. Clk Enable 362, in the embodiment shown, is the signal to be sampled and is an input to multiplexers 310. The Gater Circuit 340 may also be coupled to scan input and output signals among other types of signals.

As discussed above concerning the statistical analysis, the error of a Cac estimation due to statistical sampling may be small. However, there may be errors due to an inaccurate correlation of the sampled signal activity to the node switching capacitance, Cac. The clock gater enable signals, Clk Enable 362, are relatively easy to locate by local designers. Also these signals directly determine whether downstream circuitry is active or not, and thus, whether or not the downstream node capacitances may switch or not.

For a particular Clk Enable 362 that is sampled, a corresponding stored value of a logic high value implies at least a minimum capacitance is being switched. An additional amount of capacitance is conditionally switched, which is determined by other signals and configurations that are downstream of the clock gater enable, Clk Enable 362. Some examples of signals downstream of the gater clock enable signals that determine how Cac changes in various ways are valid bits, such as the valid bit in a load-store queue, for one example; an operand bit width; and a cache hit or miss. Although not shown in FIG. 3, in alternative embodiments, some of these signals and other signals may be logically combined with the clock gater enable signal to generate a new signal to be sampled and input to multiplexers 310. This new signal may determine the incremental capacitance to add to the minimum capacitance switched.

Also, there are signals whose assertion indicates an amount of switched capacitance aside from the clock gater enables.

Some examples are bus driver enables, mismatches in content-addressable memories (CAM), and CAM word-line (WL) drivers. A transition detector may be needed to determine the additional switched capacitance for these signals.

Figure 4:
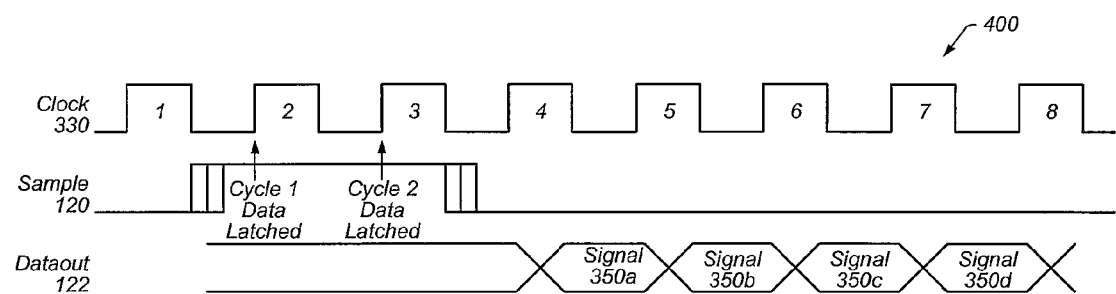
FIG. 4 is a generalized diagram illustrating one embodiment of a timing diagram for outputting sampled signal information from a unit.

FIG. 4 illustrates one embodiment of a timing diagram 400 for signals Clock 330, Sample 120, and Dataout 122 in circuit 300 of FIG. 3. Clock 330 is an ungated clock signal. When Sample 120 is asserted, the sampled signals, Signals 350, are stored in D flip-flops 330. When Sample 120 is deasserted, the sampled signals, Signals 350, are serially output in a chain on the line Dataout 122.

Figure 5:
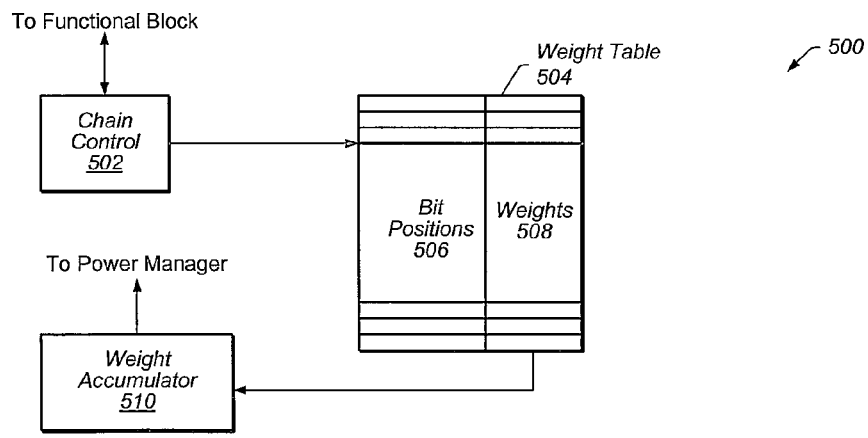
FIG. 5 is a general block diagram illustrating one embodiment of a power estimation monitor circuit.

Once the sampling of signals is done accurately, this information may be turned into a Cac estimate using a weighted average sum. Referring to FIG. 5, one embodiment of circuitry 500 for determining a weighted average sum is shown. This circuitry may reside in Monitor Control 132. Chain control 502 may convey Sample 120 to a unit within Functional Block 110. Also, chain control 502 may receive Dataout 122. After Sample 120 has been asserted in order to sample data and has been deasserted, chain control 502 may track which signal, or bit position in the serial chain, currently has its value being received. In one embodiment, a counter may be used to distinguish the sampled signals. The output of such a counter may be used to index Weight Table 504. The value conveyed by chain control 502 may be compared to entries Bit Positions 506 in Weight Table 504. When an entry hits, or matches, the index, its corresponding weight stored in Weights 508 is conveyed to Weight Accumulator 510. Here, the received weight is summed with the previously received weights.

For example, 100 signals may be chosen to be sampled. A new sampling period may have begun, and the current value received on the line Dataout 122 is the $37^{th}$ received value of this new sampling period. If this $37^{th}$ sampled value has a logic low value, then no more work needs to be done until the $38^{th}$ sample value arrives. If the $37^{th}$ sampled value has a logic high value, then the value 37 is used to index Weight Table 504. The corresponding weight for the $37^{th}$ sampled signal is conveyed to Weight Accumulator 510. This corresponding weight is summed with the accumulated weights of the 36 previous received values that had a logic high value. The method used for choosing values for the weights is described shortly below.

Figure 6:
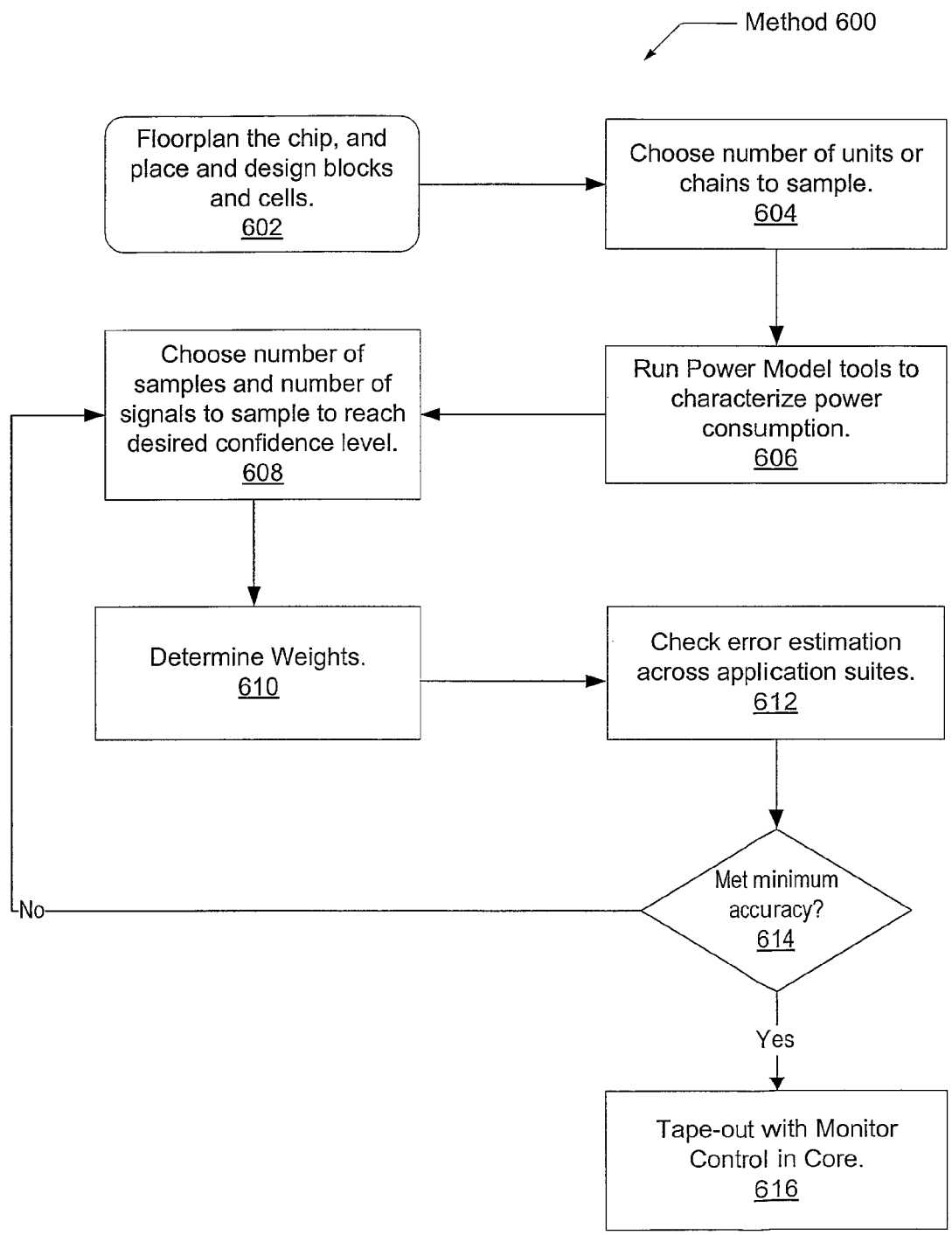
FIG. 6 is a general block diagram illustrating one embodiment of a method for accurate real-time power estimation of a core.

FIG. 6 illustrates one embodiment of a method 600 for accurate real-time power estimation of a core. Method 600 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, a semiconductor chip is floorplanned and individual blocks and cells are placed according to the floorplan in block 602. A core may be the entire chip or a portion of the chip. As stated earlier, the core may be any IC. In one embodiment, the core may be a processor core. In another embodiment, the core may be an ASIC or other semiconductor chip.

The core may be divided into units for sampling purposes in block 604. Each unit may provide a serial chain of values of predetermined sampled signals. In block 606, a power model is executed on the core over a broad set of applications in order to characterize power consumption over the die during sample intervals. In block 608, a number of samples to perform within a sample interval may be determined from a look-up table derived from statistical analysis using a Poisson distribution or other, and characterizing the node capacitance switching behavior of the core while executing applications. Then the number of signals to sample may be determined from the operational frequency, the sample interval, and the determined number of samples to take.

In block 610, a weight value is assigned to each sampled signal. A more detailed description of this process is given below. A sum of the weights of the asserted sampled signals is used to determine an accurate real-time power estimation of the core in a particular clock cycle. The sum is an estimation of the node switching capacitance, Cac, in the particular clock cycle and this sum may be translated to a power number by indexing a look-up table. This look-up table may have been generated by a characterization process when the power model was run on the core.

In block 612, the real-time power estimate generated from the sum of the weights of sampled signals is compared to the power estimate generated from the power model for each application in a predetermined application suite. If the difference between these two values is less than or equal to a predetermined minimum accuracy (conditional block 614), then design of the power estimate circuitry is complete and the chip may tape-out with the Monitor Control in the core in block 616. If the minimum accuracy is not met (conditional block 614), then control flow is returned to block 608. A new number of samples and a new number of signals to sample are chosen.

Figure 7:
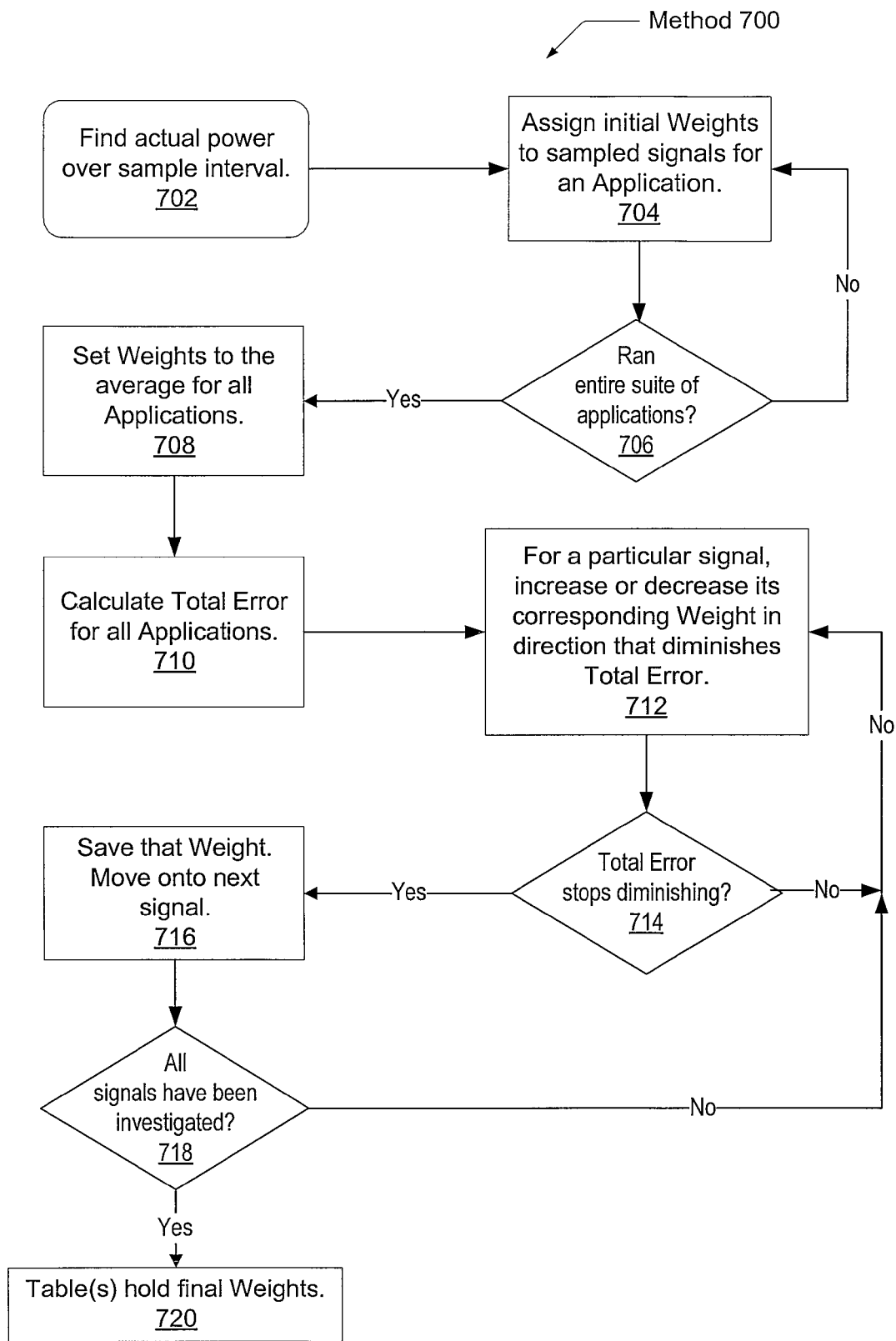
FIG. 7 is a general block diagram illustrating one embodiment of a method for determining weights to assign to sampled signals for accurate real-time power estimation of a core.

FIG. 7 illustrates a method 700 for determining weights to assign to sampled signals for accurate real-time power estimation of a core. Method 700 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, a power model is executed on the core over a broad set of applications in order to characterize power consumption over the die during sample intervals in block 702.

In block 704, an initial equal weight value is assigned to each sampled signal. In order to determine this initial value, a particular application is executed on the core and a sum of the asserted sampled signals in that clock cycle is recorded. The number of asserted sampled signals is recorded for each sampled clock cycle in the sample interval. There may be hundreds of sampled clock cycles in a sample interval. The actual power estimation for this sample interval found from the execution of the power model in block 702 is used to determine an actual Cac value. This actual Cac is divided by the total sum of asserted sampled signals over the sample interval. This derived value may be the equal initial weight value assigned to each sampled signal.

The above steps may be performed for each application in an application suite in block 706. Each application will have its own derived initial equal weight value for the sampled signals. In block 708, the average of all of these values may be the initial equal weight value used for the sampled signals.

For each application, the calculated Cac from the initial weights will have an error term. The Total Error is calculated for all of the applications in block 710. In one embodiment, this Total Error may be a sum of the errors for each application. In an alternative embodiment, this Total Error may be a sum of the squares of the errors for each application. In alternative embodiments, other equations may be used to calculate the Total Error.

In block 712, for a particular sampled signal, its corresponding initial equal weight value may be increased or decreased in a direction that diminishes the Total Error. If the Total Error has not stopped diminishing (conditional block 714), then control flow return to block 712. If the Total Error stops diminishing (conditional block 714), then in block 716, the current weight value for that particular sampled signal is saved. This value may be saved in a table such as Weight Table 504.

If all sampled signals have not been investigated for a possible value change (conditional block 718), then control flow returns to block 712. If all sampled signals have been investigated (conditional block 718), then the one or more tables storing the weight values have the final weight values in block 720.

Although the embodiments above have been described in considerable detail, numerous variations and modifications will become apparent to those skilled in the art once the above disclosure is fully appreciated. It is intended that the following claims be interpreted to embrace all such variations and modifications

What is claimed is:

1. A system comprising:
    a functional block configured to convey data corresponding to each of a predetermined number of sampled signals, wherein the predetermined number of sampled signals comprises one or more clock gater enable signals;
    a weight table configured to store a predetermined weight value for each of the predetermined number of sampled signals;
    a power monitor configured to:
        receive said data and access a corresponding weight value from the weight table for each of the predetermined number of sampled signals;
        sum the weight values of the sampled signals that have a corresponding logic high value; and
        determine a power estimate number based on said sum;
    a power manager configured to convey voltage and frequency adjustments to the functional block to alter power consumption behavior within the functional block, responsive to the power estimate number.

2. The system as recited in claim 1, wherein the power estimate number is a repeatable value independent of environment variations.

3. The system as recited in claim 2, wherein the weight values are determined using statistical analysis that assumes the functional block has node capacitance switching behavior that is approximated by a stationary random process with a Poisson distribution.

4. The system as recited in claim 2, wherein the storing of the weight values occurs once every predetermined number of clock cycles.

5. The system as recited in claim 4, wherein a predetermined number of samples within a sample interval is determined from the statistical analysis.

6. The system as recited in claim 5, wherein the predetermined number of sampled signals is determined from the operational frequency, the sample interval, and the predetermined number of samples.

7. The system as recited in claim 1, wherein the functional block comprises one or more units, wherein for a same predetermined number of samples and a same predetermined number of sampled signals, each of said one or more units comprise a lower confidence level and a higher accuracy than the functional block.

8. The system as recited in claim 1, wherein said predetermined weight values in the table are determined prior to sampling said signals.

9. The system as recited in claim 8, wherein the weight values are determined using statistical analysis that assumes the functional block has node capacitance switching behavior that is approximated by a stationary random process.

10. A method comprising:
    conveying data from a functional block, the data corresponding to each of a predetermined number of sampled signals, wherein the predetermined number of sampled signals comprises one or more clock gater enable signals;
    accessing a weight table configured to store a predetermined weight value for each of the predetermined number of sampled signals;
    receiving said data in a power monitor and using a corresponding weight value from the weight table for each of the predetermined number of sampled signals;
    summing the weight values of the sampled signals that have a corresponding logic high value;
    determining a power estimate number based on said sum; and
    conveying voltage and frequency adjustments to the functional block to alter power consumption behavior within the functional block, responsive to the power estimate number.

11. The method of claim 10, wherein the power estimate number is a repeatable value independent of environment variations.

12. The method of claim 11, wherein the weight values are determined using statistical analysis that assumes the functional block has node capacitance switching behavior that is approximated by a stationary random process with a Poisson distribution.

13. The method of claim 11, further comprising the storing of the weight values occurs once every predetermined number of clock cycles.

14. The method of claim 13, wherein a predetermined number of samples within a sample interval is determined from the statistical analysis.

15. The method of claim 14, wherein the predetermined number of sampled signals is determined from the operational frequency, the sample interval, and the predetermined number of samples.

16. The method of claim 10, wherein the functional block comprises one or more units, wherein for a same predetermined number of samples and a same predetermined number of sampled signals, each of said one or more units comprise a lower confidence level and a higher accuracy than the functional block.

17. A power monitor comprising:
    an interface configured to communicate with a functional block and a power manager, wherein said interface is configured to receive data corresponding to each of a predetermined number of sampled signals, wherein the predetermined number of sampled signals comprises one or more clock gater enable signals;
    a weight table configured to store a predetermined weight value for each of the predetermined number of sampled signals;
    a weight accumulator configured to sum the weight values of the sampled signals that have a logic high value;
    circuitry configured to determine a power estimate number based on said sum; and
    a chain control configured to convey the power estimate number to the power manager, wherein the power estimate number is translated from the sum of the weight values.

18. The power monitor as recited in claim 17, wherein the power estimate number is a repeatable value independent of environment variations.

19. The power monitor as recited in claim 18, wherein the weight values are determined using statistical analysis that assumes the functional block has node capacitance switching behavior that is approximated by a stationary random process with a Poisson distribution.

20. The power monitor as recited in claim 19, further comprising the storing of the weight values occurs once every predetermined number of clock cycles.

* * * * *